United States Patent [19]

Sogn

[11] 4,323,049
[45] Apr. 6, 1982

[54] QUARTZ WAFERING MACHINE

[76] Inventor: Leland T. Sogn, Rte, 1, Box 21F, Mokelumne Hill, Calif. 95245

[21] Appl. No.: 82,480

[22] Filed: Oct. 9, 1979

[51] Int. Cl.³ ............................................ B28D 1/04
[52] U.S. Cl. ................................................ 125/13 R
[58] Field of Search ................ 125/12, 13 R, 14; 51/108 R

[56] References Cited

U.S. PATENT DOCUMENTS

| | | | |
|---|---|---|---|
| 1,384,756 | 7/1921 | Hambuechen | 125/12 R UX |
| 1,553,227 | 9/1925 | Feyk | 125/13 R UX |
| 2,413,795 | 1/1947 | Speed | 125/14 |
| 2,506,985 | 5/1950 | Arnt | 125/13 R UX |
| 2,556,167 | 6/1951 | Coleman | 125/13 R X |
| 3,738,349 | 6/1973 | Cooper | 125/13 R |
| 4,107,883 | 8/1978 | Bein | 125/13 R |

*Primary Examiner*—Harold D. Whitehead
*Attorney, Agent, or Firm*—Blair, Brown & Kreten

[57] ABSTRACT

A machine for wafering bars of quartz or other minerals wherein a plurality of wafers can be manufactured by a simultaneous pass of the machine is provided. The structure comprises a framework, an implement which supports the bars that are to be wafered, in which the implement is rotatably driven, and a cutting spindle having a plurality of cutting implements thereon similarly supported on the framework and similarly driven so as to cut many wafers at a time. Further provided is a mechanism for advancing the cutting mechanism to provide an incremental increase in depth of the cut as the process is being performed. Structure is also included for supporting a goniometer which determines and assures that the correct angulation between the crystals and the cutting utensil exists so as to provide wafers which are properly machined and cut at the specified angle.

7 Claims, 8 Drawing Figures

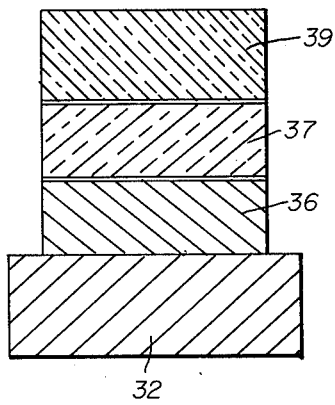
FIG. 6
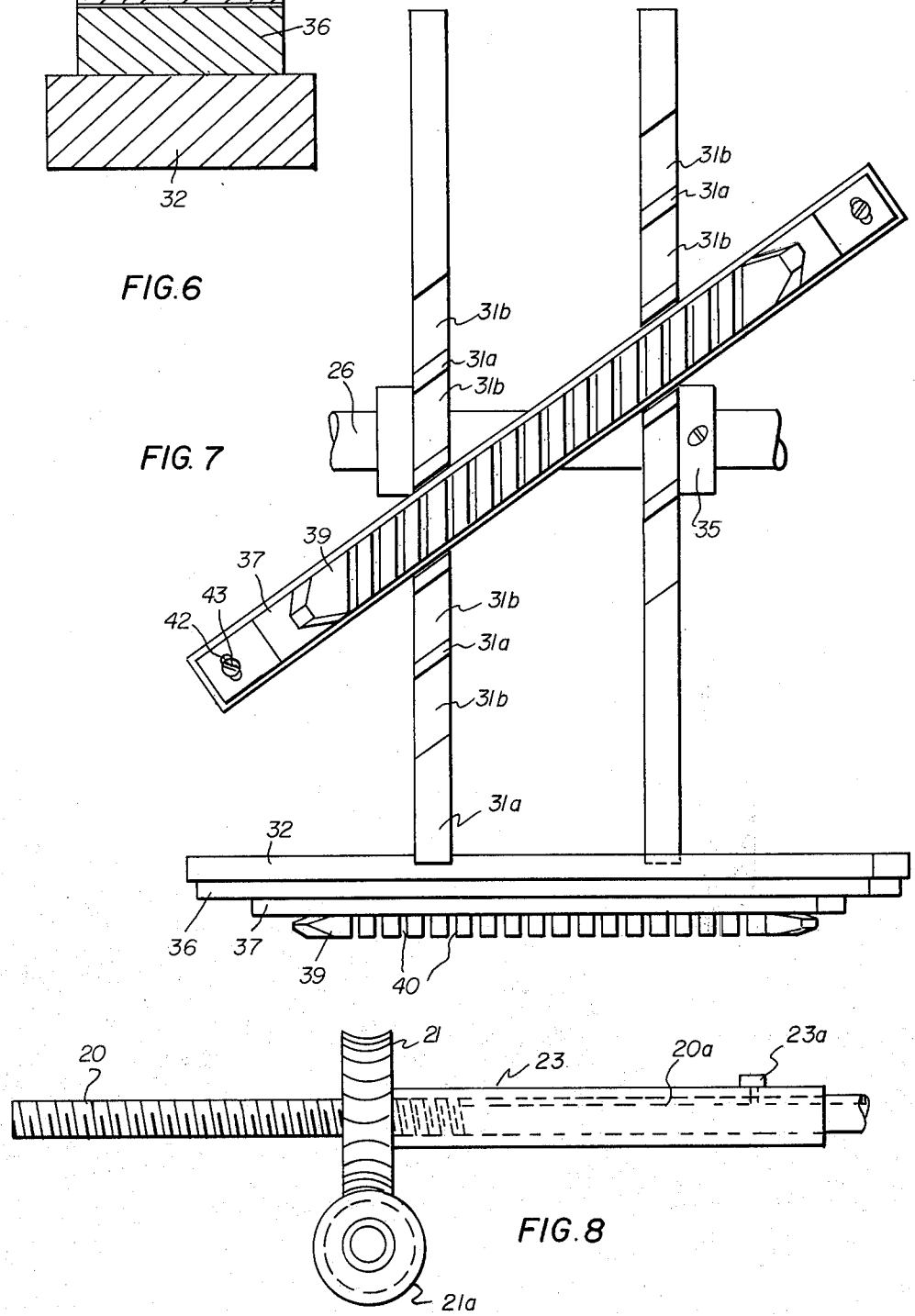
FIG. 7
FIG. 8

4,323,049

QUARTZ WAFERING MACHINE

BACKGROUND OF THE INVENTION

The need for accurately cutting crystal wafers for use in the electronics industry has been documented for a long time since the quality of the finished crystal directly relates to and affects the performance of equipment associated therewith so that the problems associated with poorly formed wafers will not be belabored any further than is noted by the prior art comprising Group 1.

U.S. Pat. No. 2,308,703—McCain
U.S. Pat. No. 2,326,319—Bailey
U.S. Pat. No. 2,349,686—Waters
U.S. Pat. No. 2,382,267—Ramsey
U.S. Pat. No. 3,838,678—Kumada et al
U.S. Pat. No. 3,841,297—Mech It is to be noted that these references provide cutting apparatus which can be characterized in that the wafers cut therefrom can effectively be considered to be produced one at a time since these mechanisms are silent on mass production type techniques for developing a plurality of wafers. Further, however, the machinery associated therewith not only provide a fewer number of finished quartz crystals than does the instant application, but also provide crystals which compared hereto have a higher defect rate and these machines are substantially more expensive to fabricate, more difficult to operate and less reliable in service.

The reference patents defined by Group 2 will now be discussed.

U.S. Pat. No. 1,384,756—Hambuechen
U.S. Pat. No. 1,474,044—Knott et al
U.S. Pat. No. 1,482,323—Sanders
U.S. Pat. No. 1,553,227—Feyk et al
U.S. Pat. No. 2,138,262—Urschel et al
U.S. Pat. No. 2,197,699—Louthan
U.S. Pat. No. 2,506,985—Arnt
U.S. Pat. No. 2,954,807—Baumann These references relate to the general art of cutting anything and while at least one of the references (Arnt) provides a structure somewhat more similar to the instant application, it is to be noted that the similarity is merely coincidental since not only are these machines not operating under the same tolerances and constraints as do cutting machines in the wafering industry, but in addition the present application can also be differentiated thereover not only structurally but functionally. It is one matter to cut celery along a line which is angulated relative to the grain of the celery stalk, and it is another matter to fabricate quartz wafers in which the external dimensions and the lattice structure (which is so important in being correctly oriented in the quartz industry) can be preserved and controlled.

SUMMARY OF THE INVENTION

Accordingly, an object of this invention is to provide a quartz wafering machine which is when compared to the analogous prior art relatively simple in construction, reliable in use, and capable of producing a plurality of uniformly shaped and oriented wafers.

Further, it is an object of this invention to provide a quartz wafering machine in which the lattice structure of the quartz can be taken into account when the cutting actually occurs so as to provide wafers of superior characteristics and having a much lower rejection rate than that which the prior art quartz wafering machines would suggest.

A further object contemplates providing means on the machine itself to assure the angulation of the quartz is correct so as to provide a proper cut.

A further object contemplates providing a plurality of quartz bars from which the wafers are to cut so that a plurality of cuts can proceed at one time and therefore a plurality of wafers can be generated each having identical physical characteristics.

These and other objects will be made manifest when considering the following detailed specification and ensuing claims when taken in conjunction with the accompanying drawings.

BRIEF DESCRIPTION OF THE DRAWINGS

FIG. 6 is a sectional view taken along lines 6—6 of FIG. 4;

FIG. 7 shows how a plurality of quartz bars can be disposed upon the quartz carrying drum shown in FIG. 3, and FIG. 8 shows a side view of the partially threaded shaft used in conjunction with a motor to regulate and control the cutting rate.

DESCRIPTION OF THE PREFERRED EMBODIMENT

Figure 1:
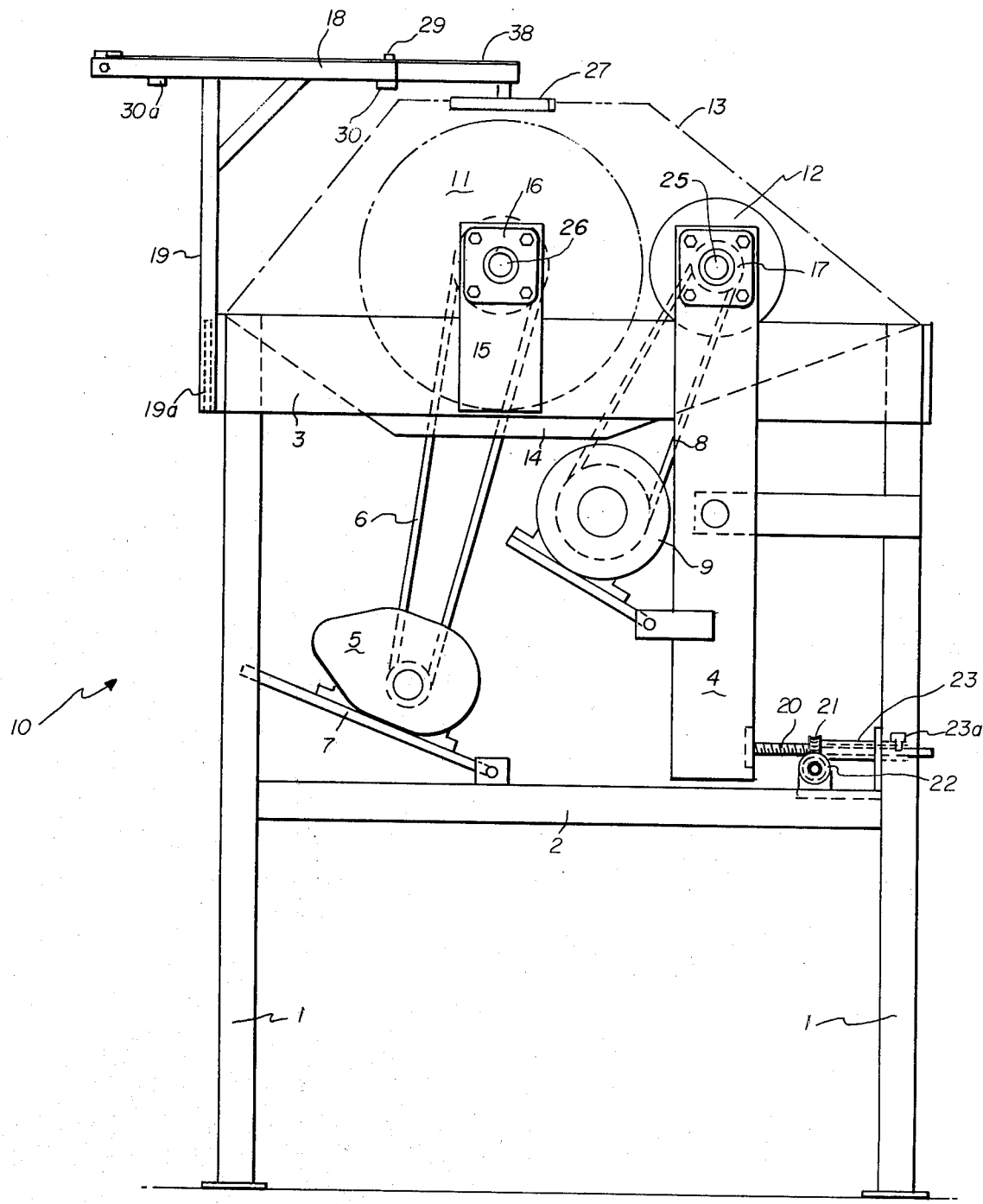
FIG. 1 is a side view of the machine according to the present invention.

Referring to the drawings now wherein like reference numerals refer to like parts throughout the several drawings, reference numeral 10 is directed to the quartz wafering machine according to the present invention.

Figure 2:
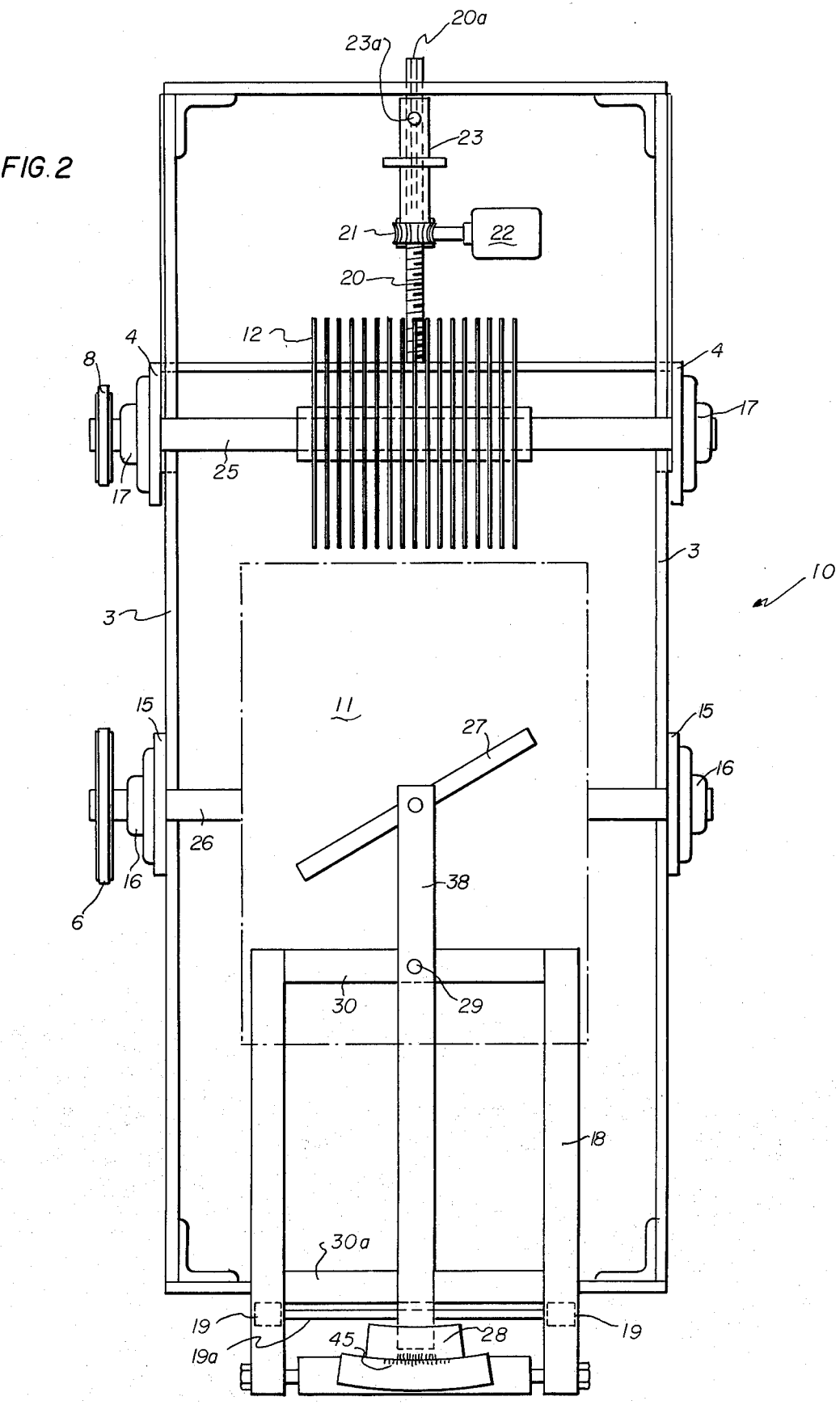
FIG. 2 is a top plan view thereof.

The machine as best seen in FIGS. 1 and 2 detail a support structure having vertically upstanding members 1 cross braced along a medial portion thereof as with bars 2 and provided with a top framework 3 which extends around the four legs forming the machine. The lower bar 2 serves as a support structure to hold thereon a motor 5 disposed on a platform 7 which is pivoted about the bar 2 and this motor 5 drives through a belt 6 the station 11 to be discussed hereinafter. Further, however, the lower support cross bar 2 holds thereon a motor 22 which is fastened at the crotch between a vertical leg 1 and the bar 2. This motor 22 drives a worm 21a as shown in FIG. 8 which communicates with the threaded worm gear 21 which in turn communicates with the threaded portion of shaft 20. About one half of shaft 20 is threaded, the remainder disposed within sleeve 23 being smooth but having a slot 20a parallel to it's length. A pin 23a fastened to the sleeve 23 protrudes into the slot or keyway 20a to prevent rotation of the shaft 20 while allowing it to translate from left to right when viewing FIG. 1. This shaft translation provides a constant feed rate to the cutting blades 12 since they are supported on and by the upstanding support 4 as shown in the drawings. Further, however, the upstanding support 4 is of suitable rigidity to allow a third motor 9 to be supported thereon. This third motor is driven by belt 8, which operates the cutting elements 12 to be defined hereinafter. Both motors 9 and 5 are pivotally mounted so that the weight of the motors maintains tension in belts 8 and 6.

The top view of FIG. 2 reveals that the belt 6 from motor 5 drives a shaft 26 through a pulley and the shaft 26 is supported by a bearing 16 set into upstanding holder forks 15 on opposed sides of the shaft 26. Rotation of this shaft therefore is shown to be able to allow the work holding station 11 to rotate as desired.

Similarly, belt 8 supported on a pulley drive shaft 25 which is supported by the upstanding members 4 through bearings 17 in turn will cause shaft 25 to drive or rotate therefore the cutting blades 12, a plurality of which are disposed substantially medially on the shaft 25 through a collar.

Overlying the work holding station 11 during mounting and adjustment of transfer bar assemblies is a framework defined by vertical elements 19 and cross brace 19a affixed to framework top portion 3, which extends up and thereafter terminates in a horizontally disposed framework 18 having a rectangular configuration and lateral cross braces 30 and 30a which, at the midpoint thereof and parallel to the horizontal bars 18, serve to support an angle or indicator goniometer for use with the wafering machine. This angle indicator is defined by a horizontal rod 38 pivoted at 29 in its connection to the cross bar 30, and the terminal portion of shaft 38 which overlies the work holding station 11 carries a bar 27 which cooperates with a vernier scale 28 at the extremity of rod 38 remote from bar 27 so that angular adjustment can be provided by comparing the scale on 28 with a scale on bar 45 parallel to support rod 38. Pivoting of this bar therefore will provide an accurate indication of the angle that the work pieces must have so that the proper cut can be made. This angle measuring assembly is in position for adjusting bar angles only during the set-up or loading phase of the operation and must be withdrawn prior to starting the wafering operation.

Figure 3:
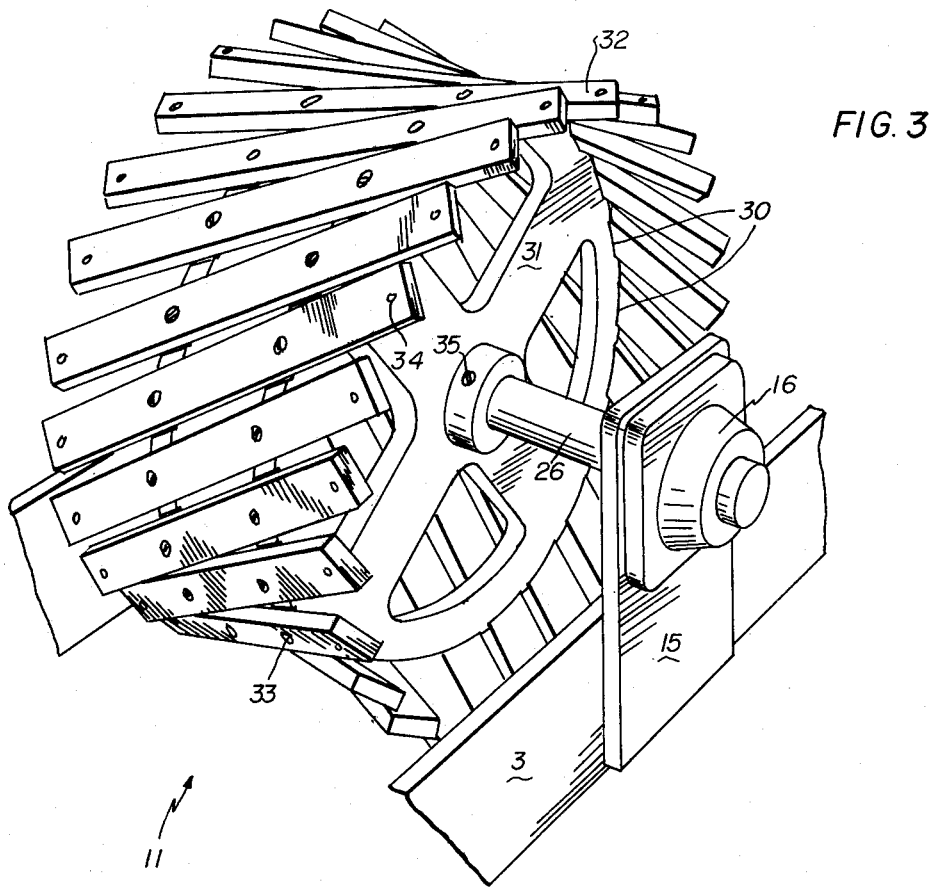
FIG. 3 details structure of the supporting bar which holds the quartz bar.
Figure 5:
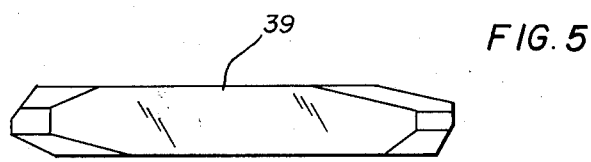
FIG. 5 is a view of the quartz as a stock item.
Figure 4:
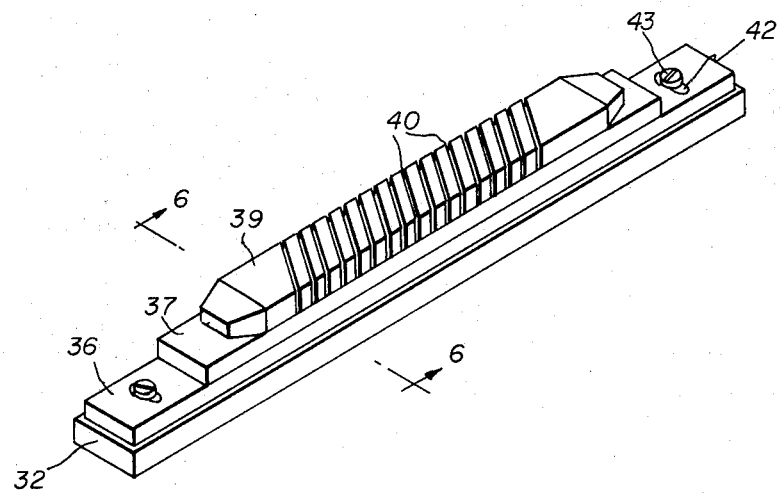
FIG. 4 shows the mechanism attached between the quartz wafer and the drum which supports the plurality of wafers.

FIGS. 3 and 7 detail the structure of work holding station 11, and the structure can generally be defined as two parallel wheels 31 of equal diameter in which flat bottomed niches 31b are machined to permit secure and accurate fastening of the parallel faced work holding support bars 32 as through screws 33. Separation between niches are designated as 31a. These grooves or niches 31b must be machined in such a way that when the support bar 32 is in position resting on the niches, a radius to the geometric center of that portion of the bar 32 lying between the wheels 31 shall be perpendicular to the bar 32. This work station 11 is supported on shaft 26 through bearings 16 and is secured to shaft 26 through set screw 35 or a keyway. Threaded holes 34 at the extremity of the support bars 32 are provided and they allow the quartz assemblies to be mounted thereon as best shown in FIG. 4. The substrate or work holding support bar 32, conveniently made out of steel, serves to support the quartz bar 39 through intermediary bars 36, 37. The next layer 36 is a steel transfer bar having elongated slots 42 at opposed extremities thereof so that a screw 43 coacting with screw holes 34 on the support bar 32 can allow the transfer bar 36 to be angulated relative to the bar 32 so as to provide the proper angulation as determined by the goniometer. Between the quartz crystal 39 and this transfer bar 36 is disposed a plate 37 made from glass, or other suitable material, which is fastened by suitable glue or chemical cement to both the transfer bar 36 and the crystal 37 so as to hold the work in place so that the cutting blades do not engage the transfer bar 36 when the wafers have been completely cut. As shown in FIG. 4, a plurality of cuts 40 can be made on the crystal bar 39 when it is mounted on the work station 11. FIG. 3 indicates and shows that a plurality of support bars 32 can be disposed on the work holder 11 so that a plurality of crystal bars 39, one to each support bar 32, can be conveniently wafered simultaneously, as shown in FIG. 7.

It should be apparent that, since each steel transfer bar 36 has an elongated slot for angular adjustment, wafers having different angles, within about ±5 degrees of the support bar 32, can be cut at the same time with one machine so as to provide greater flexibility. In such a case, the goniometer would be adjusted each time the angle of cut was to be modified. Therefore, by using different work holder stations 11 having support bars 30 set at 5°, 15°, 25°, 35°, or 45° it would be possible to cut wafers at any angle from 0° to 50° by selecting the appropriate station for the required angle to be cut. Larger angles can be cut if work holding stations of adequate sizes are provided.

It should also be apparent that the diameter of the wheels 31 which form the work holding station can be of any suitable diameter, the chief advantage of the larger wheels being the larger number of work load specimen it can accommodate. It should be apparent as well that a single wheel with a broad, flat rim can be used to support the steel support or substrate bars, in which case suitable niches must also be machined in the wheel to permit secure and accurate mounting of the bars. The sawing station is formed from a plurality of blades, with spacers between them to determine the thickness of the wafers to be sectioned. The blades 12 can be of any appropriate thickness or diameter and may be of the type used in a mucksaw slurry type operation of various abrasive grits in oil, water or other fluid supplied to the cutting area, or the blades may have a diamond or other abrasive powder bonded to or embedded in them in which case only a lubricant may be supplied to the cutting area, and extend to the area of contact between the blade and the material being sliced. The slurry mix or fluid can most conveniently be supplied to the cutting area by having the work holder station 11 dip into a reservoir of the slurry mix or fluid, held in the catch pan 14, as it rotates. Other means for distribution of the mix or fluid can be used if desired.

The rate of cutting is of course controlled by a motor 22 and worm which communicates with worm gear 21 which being threaded communicates with the threaded end of shaft 20 to produce translation in the desired direction. A cutting rate as slow as one eighth of an inch per hour or less can be maintained if desired, but a much faster rate can be obtained if desired.

Catch basin 14 will during the cutting operation mate with a shroud 13 shown in phantom to provide a protective enclosure for the cutting operation and a means for confining and collecting the lubricant that is used in cutting.

Having thus described the invention it should be apparent that numerous structural modifications are contemplated as being a part of this invention as set forth hereinabove and as defined hereinbelow by the claims.

What is claimed is:

1. In a wafering or sectioning machine comprising, in combination, a frame, a pair of spindles rotatably disposed on said frame in parallel relationship, means for rotating each of said spindles, a wheel on one of said spindles having an outer rim, means for mounting a plurality of crystal bars to be cut on said rim of said wheel in circumferentially spaced relationship, a series of spaced-apart saw blades mounted on the other of said spindles for wafering said crystal bars and means on said frame for pivoting moving said other spindle to advance said saw blades into cutting engagement with said crystal bars during the rotation of said wheel for wafering of said crystal bars during a plurality of revolutions of said wheel and adjustable means to alter the angle of said crystal bars with respect to said saw blades which includes support bars permanently affixed to said rim, transfer bars overlying said support bars having elongate slots along areas of interconnection so that the angular relationship between said transfer an support bars can be altered and then fixed, said transfer bar supports said crystal bar through an intermediate substance.

2. The device of claim 1 wherein said means for mounting said crystal bars include, grooves or niches machined in the rim of the wheel at a specified angle to permit mounting therein of permanently affixed support bars.

3. The device of claim 2 in which each permanently affixed bar supports a second steel transfer bar overlying said affixed bar, wherein said second steel bar is provided with elongated slots along the areas where said second bar connects to the first bar so that the angle of said second bar to the first bar can be altered, and wherein said second steel bar supports the crystal bar through an intermediate substance.

4. The device of claim 1 in which the plural support bars positioned in the niches on the wheel support plural transfer bars to permit cutting of a plurality of wafers at a time.

5. The device of claim 1 in which the angle orientation of the work is established on the wheel by means of a goniometer overlying said wheel during mounting of transfer bar assemblies on, and fastening them to, the fixed bars.

6. The device of claim 5 wherein said saw blades advance and retract relative to said wheel by means of a pair of spaced support arms carrying the sawing shaft, in which movement of the support arms laterally toward said wheel is regulated by the threaded end of a shaft which coacts with a worm gear which coacts with a worm driven by a motor, resetting for a new cutting operation being performed by hand.

7. The device of claim 6 in which a shroud overlies and a catch pan underlies said wheel and said saw blades so as to catch and contain particles and lubricants used in the cutting operation.

* * * * *